(12) United States Patent  
Chan et al.

(10) Patent No.: US 9,085,213 B2  
(45) Date of Patent: Jul. 21, 2015

(54) AUTOMOBILE ANTI-ROLL DEVICE

(75) Inventors: Chen Yuet Chan, Gruangzhou (CN); Kuan Chieh Chen, Gruangzhou (CN)

(73) Assignee: Jia Bin Li, FoShan, Guang Dong Province (CN)

( * ) Notice: Subject to any disclaimer, the term of this patent is extended or adjusted under 35 U.S.C. 154(b) by 1079 days.

(21) Appl. No.: 12/193,824

(22) Filed: Aug. 19, 2008

(65) Prior Publication Data

US 2011/0309592 A1  Dec. 22, 2011

(51) Int. Cl.
*B60G 21/05* (2006.01)

(52) U.S. Cl.
CPC ........ *B60G 21/05* (2013.01); *B60G 2800/9124* (2013.01)

(58) Field of Classification Search
CPC .......... B62H 1/12; B62D 61/12; B62D 61/10; B62D 61/00; B62D 49/08; B62D 37/04; B62D 37/00; B60G 2800/9124
USPC ............. 280/124.106, 124.107, 5.502, 5.506, 280/5.507, 87.2, 755, 767, 43.23, 763.1, 280/764.1, 765.1, 766.1; 180/209, 22, 21
See application file for complete search history.

(56) References Cited

U.S. PATENT DOCUMENTS

| 2,854,084 | A * | 9/1958 | Isaac ............................. 180/209 |
| 6,394,738 | B1 * | 5/2002 | Springer ....................... 414/673 |
| 6,588,799 | B1 * | 7/2003 | Sanchez ........................ 280/755 |

* cited by examiner

*Primary Examiner* — Keith Frisby  
(74) *Attorney, Agent, or Firm* — Alexander Chen, Esq.

(57) ABSTRACT

An automobile anti-roll device comprises a swing rod attached to the right and the left sides of the car that contain within a slide rod with a roller attached at the lower end. The invention further comprises push-pull rods with drive mechanism comprising a spring for driving the swing rod to swing; a pull hook for returning the push-pull rod back to its original position; a brake for restricting the sliding movement of push-pull rod; a spring for ejecting the swing rod outward; a brake for restricting the slide rod to retract; a pull hook for pulling the slide rod back to its original position; a load-bearing device attached to either the car frame or the swing rod for holding the slide rod. The invention includes a control sensor for detecting the right or left tilt angle of the car and coordinating the movement of the components of the device. The invention aims to provide an effectively preventive measure for car overturn with a simple and user-friendly structure.

1 Claim, 2 Drawing Sheets

AUTOMOBILE ANTI-ROLL DEVICE

BACKGROUND OF THE INVENTION

1. Field of the Invention

The invention relates to a vehicle safety assistant tool, particular a vehicle anti-roll device.

2. Description of the Prior Art

Currently cars in the market lack effective anti-overturn function. Car overturn could cause serious injury, damage and even death. China patent application No. 200610001050.7 entitled "automobile anti-overturn method and device" discloses an automobile anti-overturn device. The device is driven by cylinder or by explosion. The former design lacks speed and it is a challenge to add a powerful pneumatic system on the car. The latter has potential danger and high cost. Thus, the disclosed technology is difficult to find practical value.

SUMMARY OF THE INVENTION

The objective for the present invention is to provide an automobile anti-roll device.

The automobile anti-roll device for the present invention comprises a swing rod attached to the right and the left sides of the car. The swing rod contains within a slide rod. At the lower end of the slide rod a roller is attached. Furthermore, the swing rod and the car frame form a hinge joint, allowing the swing rod to swing back and forth. The invention further comprises a push-pull rod links to and slides on the car frame. Under certain driving condition the push-pull rod slides driving the swing rod to swing outward. The drive mechanism for the push-pull rod comprises a spring. The spring rebounds in the direction to allow the push-pull rod to drive the swing rod to swing outward. Also attached to the car frame is a pull hook for returning the push-pull rod back to its original position. The pull hook contains a fixed gear rack for fitting an electromechanical gear. Near the push-pull rod there is a brake for restricting the sliding movement of the push-pull rod. On the swing rod there is a spring for ejecting the slide rod outward. Near the slide rod there is a brake for restricting the slide rod to retract. On the swing rod there is a pull hook for pulling the slide rod back to its original position. The pull hook has a fixed gear rack, which fits an electromechanical gear. On the car frame or the swing rod there is a load-bearing device for holding the slide rod. The invention further includes a control sensor to be installed in the car for detecting the right or left tilt angle and coordinating the movement among the above-mentioned parts.

The principle for the invention is described in the following: the control sensor detects the right or left tilt angle: when the tilt angle exceeds the normal range, the control sensor triggers and releases the push-pull rod brake. Under the spring action, the push-pull rod drives the swing rod to swing outward. Once swung out, the push-pull rod is restricted by the brake and remained in an outward swinging state. As soon as the swing rod swings outward, the slide rod under its own action and the spring action rapidly sticks outward out of the swing rod. Once stick out, the slide rod is restricted by the brake on the swing rod and remained sticking out. In this state, the roller of the slide rod touches the ground and allows itself to support the car, and prevents the car from further tilting. Afterward, the car starts to return to the normal state under its own action. Once the tilt angle returns to normal range, the brake on the swing rod is released and the pull hook on the swing rod starts to retract. The pull hook pulls the slide rod back into the swing rod. When the slide rod is back in the swing rod, the brake on the push-pull rod is released. The pull hook for the push-pull rod immediately starts to run and returns the push-pull rod to its original position. This further drives the swing rod to swing backward. After the swing rod swings back to its original position, the push-pull rod is restricted again by the brake allowing the swing rod to maintain in the back-swing position. Once this is completed, the pull hook for the push-pull rod returns to its original position and gets ready for the next action. After the swing rod swings back to its original position, the slide rod is on the load-bearing device. The pull hook for the slide rod returns to its original position and becomes ready for the next action. Then the entire mechanism is back to its initial state. The above-mentioned parts are controlled and coordinated by the control sensor.

The advantages for the invention is to effectively prevent car overturn by a simple structure and user-friendly mechanism.

DETAILED DESCRIPTION OF THE PREFERRED EMBODIMENT

Figure 1:
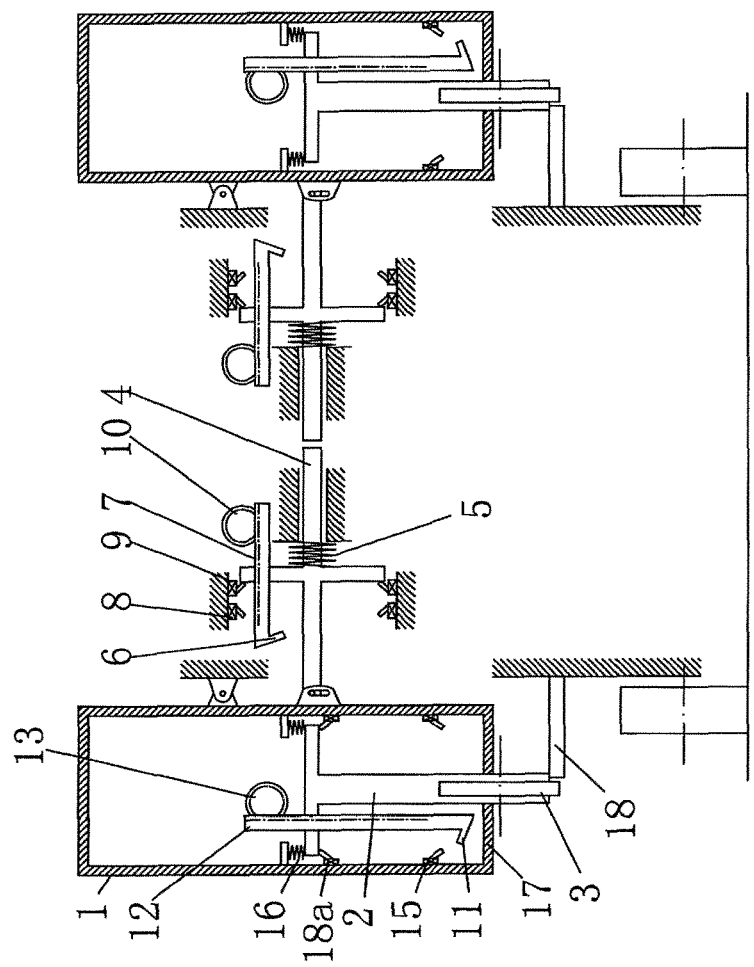
FIG. 1 is the principle diagram for the present invention.

As shown in FIG. 1, the car anti-overturn device comprises swing rods 1 attached to the right and left sides of the car. Each swing rod 1 contains within a slide rod 2. At the lower end of the slide rod 2 a roller 3 is attached. The swing rod 1 and the car frame form a hinge joint allowing the swing rod 1 to swing back and forth. On the car frame a push-pull rod 4 is attached for driving the swing rod 1 to swing. The push-pull rod 4 connects to the swing rod 1. When the push-pull rod 4 is sliding, it drives the swing rod 1 to swing. A spring 5 is attached on the car frame for driving the push-pull rod 4 to slide. The spring 5 rebounds in the direction for the push-pull rod 4 to drive the swing rod 1 to swing outward. A pull hook 6 is attached on the car frame for returning the push-pull rod 4 back to its original position. The pull hook 6 has a fixed gear rack 7, which fits an electromechanical gear 10. Near the push-pull rod 4 there are brakes 8, 9 to stop the sliding movement of the push-pull rod 4. The brakes 8, 9 can adopt moveable electromagnet to restrict the sliding of the push-pull rod 4. On the swing rod 1 there are a spring 16 to eject the slide rod 2 outward and a brake 15 to stop the slide rod 2 to retract. The brake 15 can adopt the same structure as the brakes 8, 9. On the swing rod 1 there is a pull hook 11 to pull the slide rod 2 back to its original position. The pull hook 11 has a fixed gear rack 12, which fits an electromechanical gear 13. At the lower end of the swing rod 1 a positioning limiting device 17 is installed for preventing the slide rod 2 from disengaging with the swing rod 1. On the car frame there is a load-bearing device 18 for holding the slide rod 2. The load-bearing device 18 also adopts a moveable electromagnet which enables its placement inside the swing rod 1. FIG. 1 shows a load-bearing device 18a. Both or either of the load-bearing device 18 and the load-bearing device 18a may be installed.

The car anti-roll device further comprises a control sensor (not shown in the figure) for detecting the right or left tilt angle and coordinating the movement among the above-mentioned parts. The circuits for the control sensor may be designed with normal circuit design principle according to the logic sequence for the function of each part. For example, it may use single chip circuit program to control the action for each part. It may adopt known position switch to check the position for the push-pull rod, the slide rod and the swing rod. It may also adopt known tilt angle sensor to detect the tilt state. All the position switches and the tilt angle sensors connect to the single chip through an interface circuit.

Figure 2:
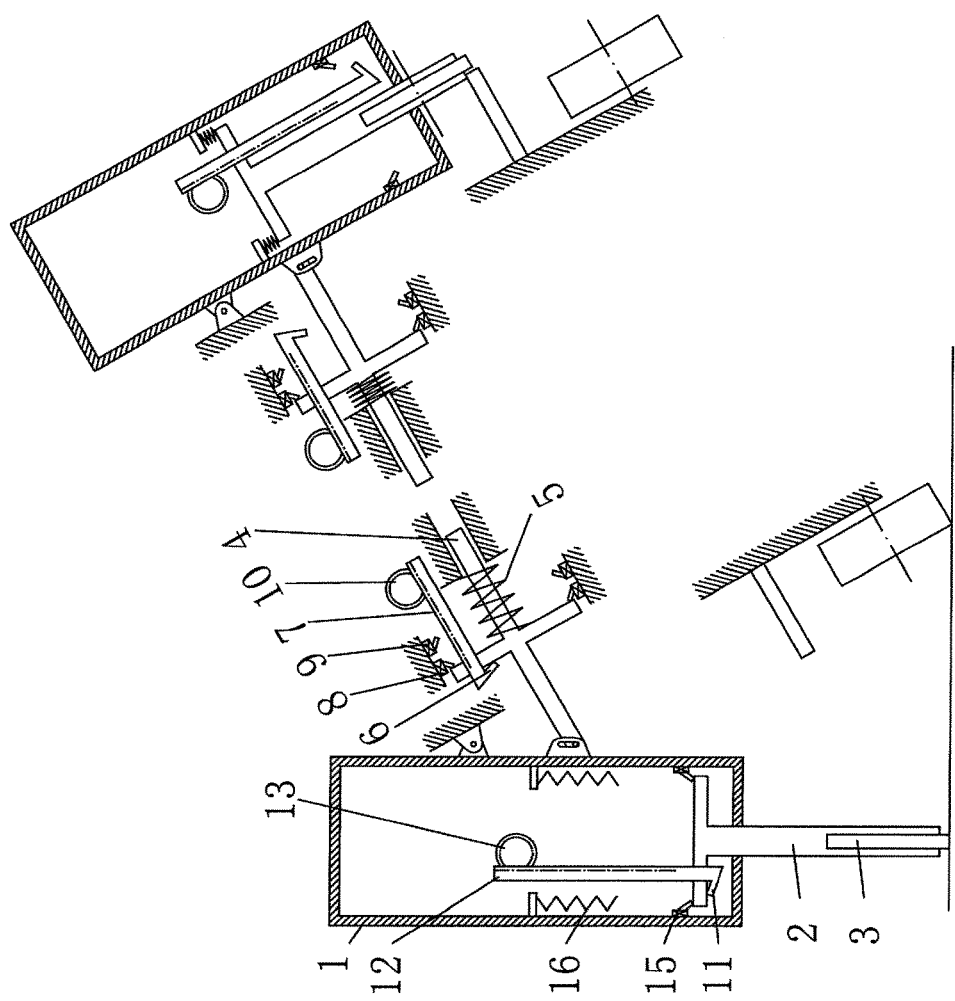
FIG. 2 is the operation principle for the present invention when a car is tilted.

The following describes the principle for the present invention with illustrative figures. The control sensor monitors and detects the tilt angle. When the tilt angle exceeds the normal range, as shown in FIG. 2 when a large tilt angle on the left, the brake 9 on the car frame releases the restriction on the push-pull rod 4 and the spring 5 drives the push-pull rod 4 to slide to the left. Then the push-pull rod 4 drives the swing rod 1 to swing to the left. After this, the push-pull rod 4 is restricted by brake 8 from further movement. Therefore, the swing rod 1 maintains its state of swinging to the left, as shown in FIG. 2. After the swing rod 1 swings to the left, the slide rod 2 under its own action and the spring 16 action rapidly sticks outward out of the inside of the swing rod 1. As soon as the slide rod 2 sticks out, it is immediately restricted by the brake 15 on the swing rod 1 and remains in a state of sticking out. At this point, the roller 3 at the lower end of the slide rod 2 touches the ground and allows itself to support the car body and prevent the car from any further tilting, as shown in FIG. 2. Afterward, the car starts to return to the normal state under its own action. Once the tilt angle returns to normal range, the brake 15 on the swing rod 1 stops restriction on the slide rod 2. At the same time, the gear 13 electromechanically drives the gear rack 12 to move inward and pass through the pull hook 11, and therefore it moves the slide rod 2 back to its original position. When the slide rod 2 drives the swing rod 1 to move back, the brake 8 stops its restriction on the push-pull rod 4. At the same time, the gear 10 electromechanically drives the gear rack 7 to move to the right and pass through the pull hook 6, and therefore it moves the push-pull rod 4 back to its original position. When the push-pull rod 4 is moving to the right, it drives the swing rod 1 to swing to the right. When the swing rod 1 is back to its original position, the push-pull rod 4 is restricted again by the brake 9 and cannot slide. Thus, the swing rod 1 maintains its position. Afterward, the gear 10 electromechanically reverses to drive the gear rack 7 and the pull hook 6 to slide to the left and return to its original position and become ready for the next action. When the swing rod 1 swings back to its original position, the gear 13 on the swing rod 1 reverses to drive the gear rack 12 and the pull hook 11 to slide outward and return to its original position and get ready for the next action. When the pull hook 11 is back to its original position, the slide rod 2 is supported by the load-bearing device 18 or by the load-bearing device 18a. At this point, the entire mechanism is back to the initial state as shown in FIG. 1.

What is claimed is:

1. An automobile anti-roll device comprises: a swing rod attached to the right and the left sides of a car of which the swing rod and a car frame form a hinge joint allowing the swing rod to swing back and forth; a slide rod contained within the swing rod, wherein a roller is attached to the lower end of the slide rod; the device further comprises a push-pull rod that links to and slides on the car frame of which the sliding motion of the push-pull rod drives the swing rod to swing outward; said push-pull rod includes a drive mechanism comprising a spring; said spring rebounds in the direction to allow the push-pull rod to drive the swing rod to swing outward; a pull hook attached to the car frame for returning the push-pull rod back to its original position; said pull hook comprises a fixed gear rack for fitting an electromechanical gear; at least two sets of brakes are installed in front of the push-pull rod for restricting the sliding movement of the push-pull rod; at least one sets of springs are installed in the swing rod for ejecting the slide rod outward; at least one sets of brakes are installed adjacent to the slide rod for restricting the slide rod from retracting; a pull hook installed in the swing rod for pulling the slide rod back to its original position; said pull hook comprises a fixed gear rack for fitting an electro-mechanical gear; a load-bearing device installed either on the car frame or the swing rod for holding the slide rod; and a control sensor installed on the car for detecting the right or left tilt angle and coordinating the movement of the components of the device.

* * * * *